(12) United States Patent
Isaac et al.

(10) Patent No.: US 6,427,445 B1
(45) Date of Patent: Aug. 6, 2002

(54) VARIABLE NOZZLE TURBINE CONTROL STRATEGY

(75) Inventors: Emad S. Isaac, Woodridge; John E. Bernhardt, Evergreen Park; Michael J. McNulty, Lombard, all of IL (US)

(73) Assignee: International Engine Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/777,579

(22) Filed: Feb. 5, 2001

Related U.S. Application Data (60) Provisional application No. 60/181,489, filed on Feb. 10, 2000.

(51) Int. Cl.⁷ .............................................. F02D 23/00
(52) U.S. Cl. ........................... 60/602; 60/600; 60/601; 60/603; 123/564
(58) Field of Search .......................... 60/602, 600, 601, 60/603; 123/564

(56) References Cited

U.S. PATENT DOCUMENTS

| | | |
|---|---|---|
| 4,428,199 A | 1/1984 | Moore et al. |
| 4,660,382 A | 4/1987 | Ueno et al. ................ 60/602 |
| 4,671,068 A | 6/1987 | Moody et al. ............... 60/602 |
| 4,672,814 A | 6/1987 | Abo et al. ................... 60/602 |
| 4,685,302 A | 8/1987 | Abo et al. ................... 60/602 |
| 4,691,521 A | 9/1987 | Hirabayashi et al. ......... 60/602 |
| 4,702,080 A | 10/1987 | Ueno et al. ................. 60/602 |
| 4,732,003 A | 3/1988 | Ueno et al. ................. 60/602 |
| 4,756,161 A | 7/1988 | Hirabayashi ................ 60/602 |
| 4,763,476 A | 8/1988 | Hirabayashi ................ 60/602 |
| 4,765,141 A | 8/1988 | Hirabayashi ................ 60/602 |
| 4,779,423 A | 10/1988 | Szczupak .................. 60/602 |
| 5,123,246 A | 6/1992 | Younessi et al. ............ 60/602 |
| 5,680,763 A * | 10/1997 | Unland et al. .............. 60/602 |
| 5,867,986 A | 2/1999 | Buratti et al. .............. 60/602 |
| 5,873,248 A * | 2/1999 | Houtz ...................... 60/602 |
| 5,974,801 A * | 11/1999 | Houtz ...................... 60/602 |
| 6,000,221 A | 12/1999 | Church et al. .............. 60/602 |
| 6,220,232 B1 * | 4/2001 | Torno et al. ............... 60/602 |
| 6,272,859 B1 * | 8/2001 | Barnes et al. .............. 60/602 |

FOREIGN PATENT DOCUMENTS

| | | | |
|---|---|---|---|
| DE | 19751977 A1 | 5/1999 | |
| EP | 0786589 A1 | 1/1997 | |
| WO | WO97/45633 | 12/1997 | |
| WO | WO 00/20746 | * 4/2000 | .................. 60/602 |

* cited by examiner

*Primary Examiner*—Thomas Denion
*Assistant Examiner*—Thai-Ba Trieu
(74) *Attorney, Agent, or Firm*—Dennis Kelly Sullivan; Jeffrey P. Calfa; Neil T. Powell (57) ABSTRACT

A variable nozzle turbocharger (12) creates engine boost. Boost is controlled by controlling the position of vanes within turbocharger. A processor develops a control signal (29) for controlling vane position. The processor develops a value for desired boost and processes that value with a value corresponding to the amount of boost being created by the turbocharger to generate error data (48A) defining error between the amount of boost being created by the turbocharger and the desired boost, and the processor develops a component of the control signal by P-LI-D processing (62) of the error data. Other components of the control signal are a feed-forward value from a look-up table (34) and a value from an overspeed protection function (60).

14 Claims, 9 Drawing Sheets

VARIABLE NOZZLE TURBINE CONTROL STRATEGY

This application claims benefits of provisional App. No. 60/181,489 filed Feb. 10, 2000.

FIELD OF THE INVENTION

This invention relates generally to control of turbocharged diesel engines that propel motor vehicles, and in particular to control of a variable nozzle turbocharger of such an engine.

BACKGROUND AND SUMMARY OF THE INVENTION

A turbocharger is one type of device that is used to supercharge an internal combustion engine. A diesel engine that is supercharged by a turbocharger is sometimes referred to as a turbocharged diesel. A turbocharger comprises a turbine that is powered by engine exhaust gas and coupled by a shaft to operate a compressor that boosts pressure in the engine air intake system downstream of the compressor. One way to control boost pressure is to control turbine operation.

There are several different forms of turbine control. One form of control involves the construction of the turbocharger itself. A turbocharger that has a variable geometry, or variable nozzle, is capable of changing the manner in which exhaust gas that flows through the turbocharger interacts with the turbine, and hence controlling the pressure, i.e. boost, that the compressor creates in the engine intake manifold. One type of variable geometry, or variable nozzle, turbocharger comprises movable vanes whose positions are selectively controlled to in turn selectively control the nature of exhaust gas interaction with the turbine, and hence the boost pressure developed by the turbocharger. The turbocharger includes a device for interfacing an electric control with the movable vanes. That device comprises an electromechanical actuator having a solenoid for setting vane position according to the extent to which the solenoid is electrically energized. With the solenoid placed under the control of the engine electronic control system, the extent to which the solenoid is energized, and hence vane position, are determined by the degree of modulation of a pulse width modulated (PWM) signal created by the electronic control system. The device may utilize a medium like fluid power, hydraulics for example, that is controlled by the solenoid actuator to impart movement to the vanes.

U.S. Pat. Nos. 4,428,199; 4,660,382; 4,671,068; 4,685,302; 4,691,521; 4,702,080; 4,732,003; 4,756,161; 4,763,476; 4,765,141; 4,779,423; 5,123,246; 5,867,986; 6,000,221; and International Application WO 99/23377 relate to control of turbocharged internal combustion engines. Certain of those documents relate to control of variable geometry turbochargers. Both documents WO 99/23377 and 6,000,221 disclose systems for control of the variable geometry of a turbocharger utilizing a signal from a turbocharger vane position sensor as feedback in closed-loop control of the vanes.

The present invention is distinguished by a closed-loop control system for controlling boost without a vane position sensor by utilizing certain data already available in an engine control system.

Certain of the documents disclose systems that employ PID functions for control purposes.

The present invention is distinguished from those systems by a P-LI-D function in which the integration function is selectively, or conditionally, employed depending on prevailing conditions.

One aspect of the present invention relates to a novel strategy for control of a variable geometry, or variable nozzle, turbocharger of an internal combustion engine. The disclosed strategy is implemented in a microprocessor-based engine control system, and utilizes certain data that is already available to the control system and/or developed by the processor. Certain data may be programmed into the control system.

Individual data may be categorized as: an input variable; a local variable; or an output variable. Input variables include barometric pressure; manifold pressure; engine load; and engine speed. Programmable parameters include an enable feature; high engine idle speed; and low engine idle speed. Each variable is calibrated in any suitable unit of measurement.

The input variables and the programmed parameters are applied to the general control strategy. The control operates on those variables and parameters in accordance with the general strategy to develop a PWM signal applied by a driver circuit to the solenoid that controls the turbocharger vane position.

One general aspect of the invention relates to control of a variable nozzle turbocharger of an internal combustion engine for changing boost according to changes in both engine speed and engine load to achieve desired boost appropriate to various combinations of engine speed and engine load so that boost appropriate to each particular combination is consistently achieved as the engine operates.

Another aspect relates to control of a variable nozzle turbocharger of an internal combustion engine for avoidance of turbine shaft speeds that exceed a predefined maximum.

Still another aspect relates to control of a variable nozzle turbocharger of an internal combustion engine for adjusting desired boost according to changing barometric conditions, like those that may be experienced when a vehicle being powered by such an engine is driven at different altitudes.

Still other aspects of the invention relate to details of the disclosed control strategy and its various sub-strategies. While the conditional integration provided by the P-LI-D control sub-strategy is useful in turbocharger boost control, it may provide advantages in other closed-loop control systems.

One general aspect of the claimed invention relates to an internal combustion engine comprising a turbocharger that creates engine boost and has a selectively positionable mechanism for controlling the amount of boost created by passage of exhaust gas through the turbocharger. A control selectively positions the mechanism to control the amount of boost in accordance with data inputs. The control comprises a processor for processing data, including the data inputs, to develop a control signal for selectively positioning the mechanism. A first data input to the processor comprises data corresponding to engine load, and a second data input to the processor comprising data corresponding to engine speed. A look-up table is programmed with values representing desired boost corresponding to sets of values representing various combinations of engine speed and engine load. A third data input to the processor comprises data corresponding to the amount of boost being created by the turbocharger.

The processor selects from the look-up table a value for desired boost corresponding to values of the first data input and the second data input. The processor processes the value of the third data input and the selected value for desired boost from the look-up table to generate error data defining error between the amount of boost being created by the turbocharger and the desired boost. The processor further processes the error data according to the value of the error data to cause the control signal to position the mechanism to reduce the error such that when the error data is less than a predetermined value, further processing comprises processing the error data with proportional, integral, and derivative control, and when the error data is not less than the predetermined value, the further processing comprises processing the error data with proportional and derivative control but without integral control.

Another general aspect of the claimed invention relates to an internal combustion engine comprising a turbocharger that creates engine boost and has a selectively positionable mechanism for controlling the amount of boost created by passage of exhaust gas through the turbocharger. A control selectively positions the mechanism to control the amount of boost in accordance with data inputs. The control comprises a processor for processing data, including the data inputs, to develop a control signal for selectively positioning the mechanism. A first data input to the processor comprises data corresponding to engine load, a second data input to the processor comprises data corresponding to engine speed, and a third data input to the processor comprises data corresponding to the amount of boost being created by the turbocharger. A first look-up table is programmed with values representing desired boost corresponding to sets of values representing various combinations of engine speed and engine load, and a second look-up table is programmed with values representing feed-forward values for use in developing the control signal: correlated with sets of values representing various combinations of engine speed and engine load. A function generator is programmed with values for turbocharger speed corresponding to values of boost for a given barometric pressure.

The processor selects from the first look-up table a value for desired boost corresponding to values of the first data input and the second data input, from the second look-up table, a feed-forward value corresponding to values of the first data input and the second data input, and from the function generator, a value for turbocharger speed corresponding to the value of the third data input. The processor processes the value of the third data input and the value of desired boost selected from the first look-up table to generate a value for error data defining error between the amount of boost being created by the turbocharger and the desired boost. The processor further processes the error data according to the value of the error data to create a first component of the control signal for causing the mechanism to reduce the error such that when the value of error data is less than a predetermined value, further processing comprises processing the error data with proportional, integral, and derivative control, and when the value of error data is not less than the predetermined value, the further processing comprises processing the error data with proportional and derivative control signal but without integral control. The processor processes the selected feed-forward value from the second look-up table to create a second component of the control signal, and the processor processes the selected turbocharger speed from the function generator to create a third component of the control signal for limiting turbocharger speed to a predetermined maximum speed during a condition when the control signal would otherwise be calling for a turbocharger speed greater than the predetermined maximum.

Another general aspect of the claimed invention relates to an internal combustion engine comprising a variable nozzle turbocharger powered by passage of exhaust gas through the turbocharger for creating and controlling engine boost and a control for controlling vane position of the variable nozzle turbocharger to control the amount of boost in accordance with data inputs. The control comprises a processor for processing data, including the data inputs, to develop a control signal for controlling the vane position.

The processor processes certain data to develop a value for desired boost and processes that value with a value corresponding to the amount of boost being created by the turbocharger to generate error data defining error between the amount of boost being created by the turbocharger and the desired boost, and the processor develops the control signal by further processing of the error data.

Still another general aspect of the claimed invention relates to an internal combustion engine comprising a device that comprises a selectively positionable mechanism in a flow path through the engine for controlling a pressure in the flow path. A control selectively positions the mechanism in accordance with data inputs. The control comprises a processor for processing data, including the data inputs, to develop a control signal for selectively positioning the mechanism. The processor generates error data for positioning the mechanism, and processes the error data according to the value of the error data to cause the control signal to position the mechanism to reduce the error such that when the value of error data is less than a predetermined value, the error data is processed using proportional, integral, and derivative control, and when the value of error data is not less than the predetermined value, the error data is processed using proportional and derivative control but without integral control.

Other general aspects of the claimed invention relate to the methods for controlling boost and pressure in engines as described above.

The foregoing, along with further aspects, features, and advantages of the invention, will be seen in this disclosure of a presently preferred embodiment of the invention depicting the best mode contemplated at this time for carrying out the invention. This specification includes drawings, briefly described below, and contains a detailed description that will make reference to those drawings.

DESCRIPTION OF THE PREFERRED EMBODIMENT

Figure 1:
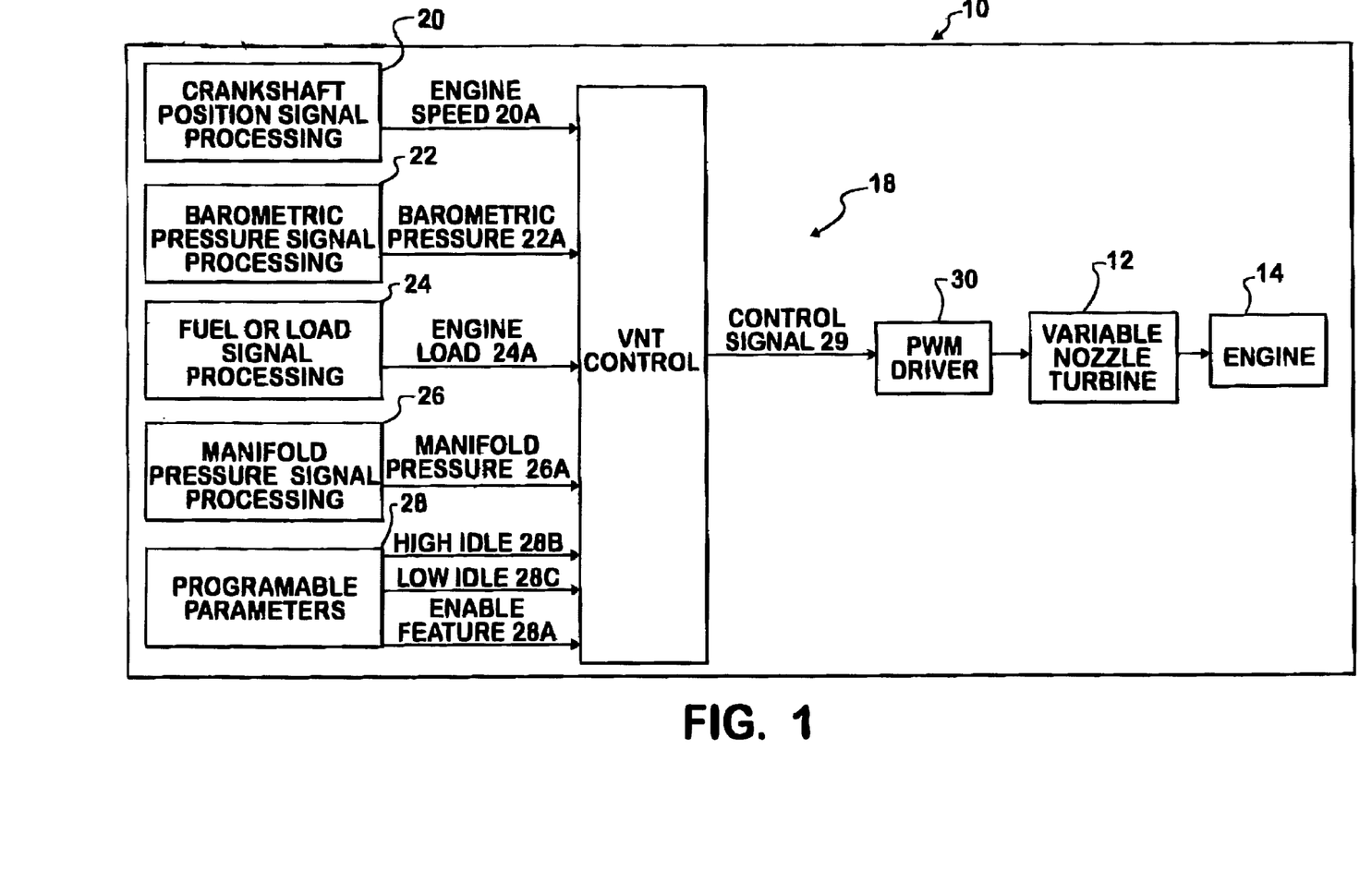
FIG. 1 is a general schematic diagram showing input variables and programmed parameters applied to a general strategy to develop a PWM signal delivered through a driver circuit to a solenoid that controls turbocharger vane position, in accordance with principles of the present invention.

FIG. 1 illustrates a general strategy 10, in accordance with principles of the present invention, for control of a variable nozzle turbocharger 12 of an internal combustion engine 14 that powers a motor vehicle. An example of such a vehicle is a medium or heavy truck having a chassis containing a powertrain in which engine 14 is a fuel-injected diesel engine operatively coupled through a drivetrain to driven wheels for propelling the vehicle. Engine 14 comprises individual fuel injectors that inject diesel fuel into individual engine cylinders in properly timed relation to engine operation.

An electronic engine control 18 that possesses digital processing capability is associated with engine 14. Control 18 may comprise one or more microprocessors that process data from various input data signal sources in accordance with programmed algorithms to develop certain signals used in the performance of various functions associated with operation of engine 14. The signals processed by control 18 may be ones that originate at external sources (input variables) and/or ones that are generated internally of control 18 (local variables).

One of the primary functions of control 18 is to operate engine 14 in a way that produces output torque appropriate to certain variable input signals, including a driver input from a sensor sometimes referred to as an accelerator position sensor (not shown in the Figures). An accelerator position sensor is linked with an accelerator pedal of the vehicle (also not shown) and delivers to control 18 a signal indicating the extent to which the driver is depressing the accelerator pedal. Control 18 operates engine 14 in manner that strives to faithfully respond to the accelerator position signal, while also taking into account certain variables that are relevant to achieving proper engine operation, but without operating the engine in ways that are considered inappropriate.

In operating engine 14, control 18 performs the function of opening and closing the fuel injectors at proper times during the engine operating cycle so that appropriate amounts of fuel are injected at the proper times. Control 18 therefore develops fuel injector control signals by processing various input data signals in accordance with preprogrammed fuel control algorithms. Another of the functions performed by control 18 is control of turbocharger boost, such as control of turbine vane position in a variable nozzle turbocharger. FIG. 1 represents that portion of engine control 18 for accomplishing that function in accordance with principles of the present invention.

Input variables to control 18 for accomplishing turbocharger vane control include: Engine Speed 20A; Barometric Pressure 22A; Engine Load 24A; and Manifold Pressure 26A. The blocks 20, 22, 24, and 26, labeled Crankshaft Position Signal Processing, Barometric Pressure Signal Processing, Fuel or Load Signal Processing, and Manifold Pressure Signal Processing respectively, represent certain processing that may be used to develop, from raw data sources, the respective data values of these four input variables that are digitally processed by control 18. Any suitable raw data sources may be used. For example, differentiating a crankshaft position signal may provide engine speed data. Engine load may be indicated by how heavily the engine is being fueled, in which case a fueling command derived from the accelerator position sensor may be used to develop engine load data.

Programmed parameters for turbocharger vane position control include: Enable Feature 28A, which enables the variable nozzle control function to be performed; High Idle Speed 28B; and Low Idle Speed 28C. The block 28, labeled Programmable Parameters, denotes the fact that these three parameters may be programmed for the particular engine and/or vehicle.

The processing of data representing these input variables and programmable parameters by control 18, in accordance with the inventive control strategy, yields a Control Signal 29 that is an input to a block 30, labeled PWM Driver, denoting a circuit that creates a corresponding pulse width modulated signal suitable for energizing the solenoid that controls turbocharger vane position.

Certain additional data used in processing are calibration constants that will be mentioned from time to time in the ensuing description. A calibration constant is programmed in control 18 during engine or vehicle manufacture for the particular engine and vehicle.

Figure 2A:
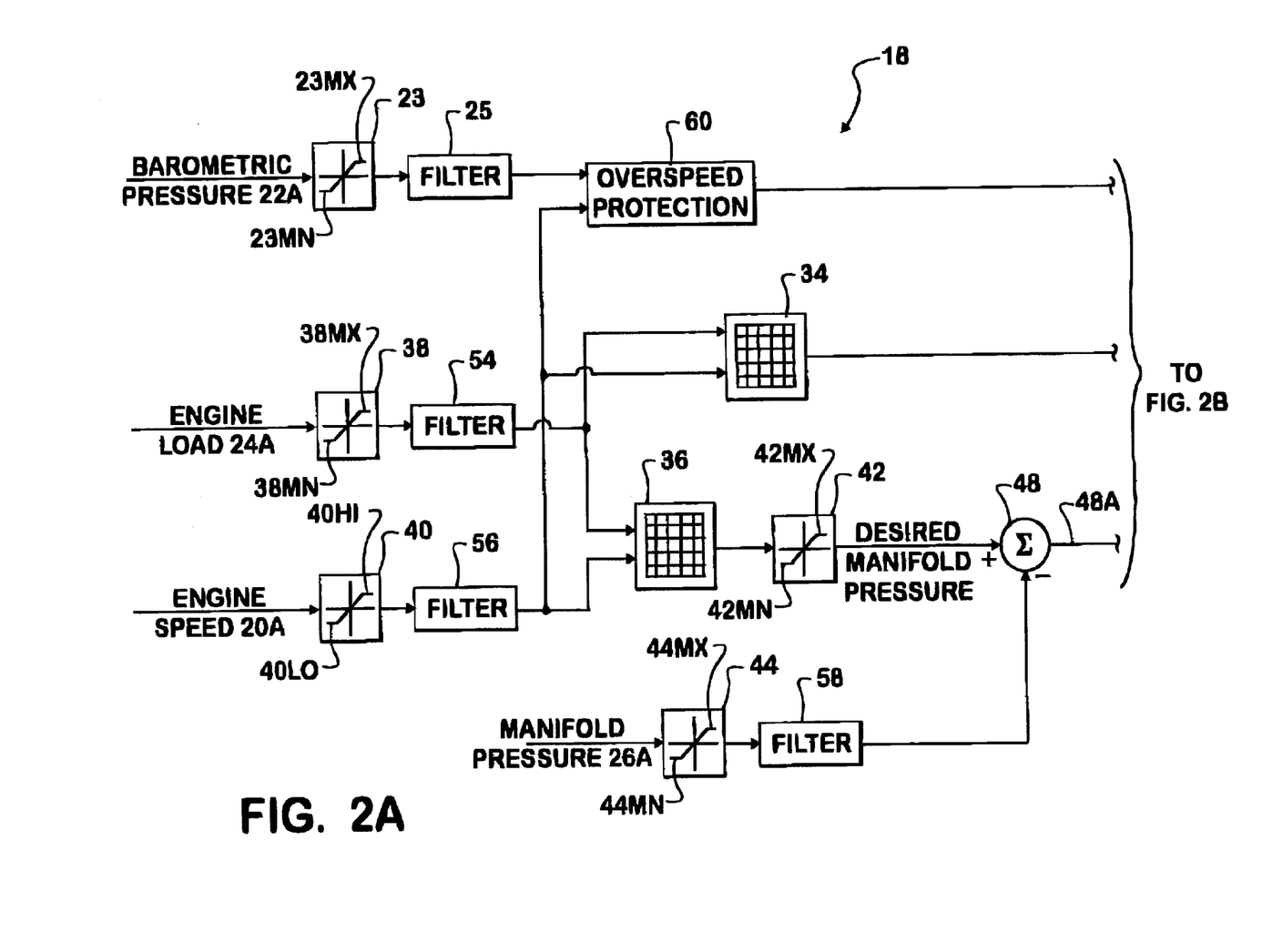
FIGS. 2A and 2B collectively form a more detailed schematic diagram of the general strategy.
Figure 2B:
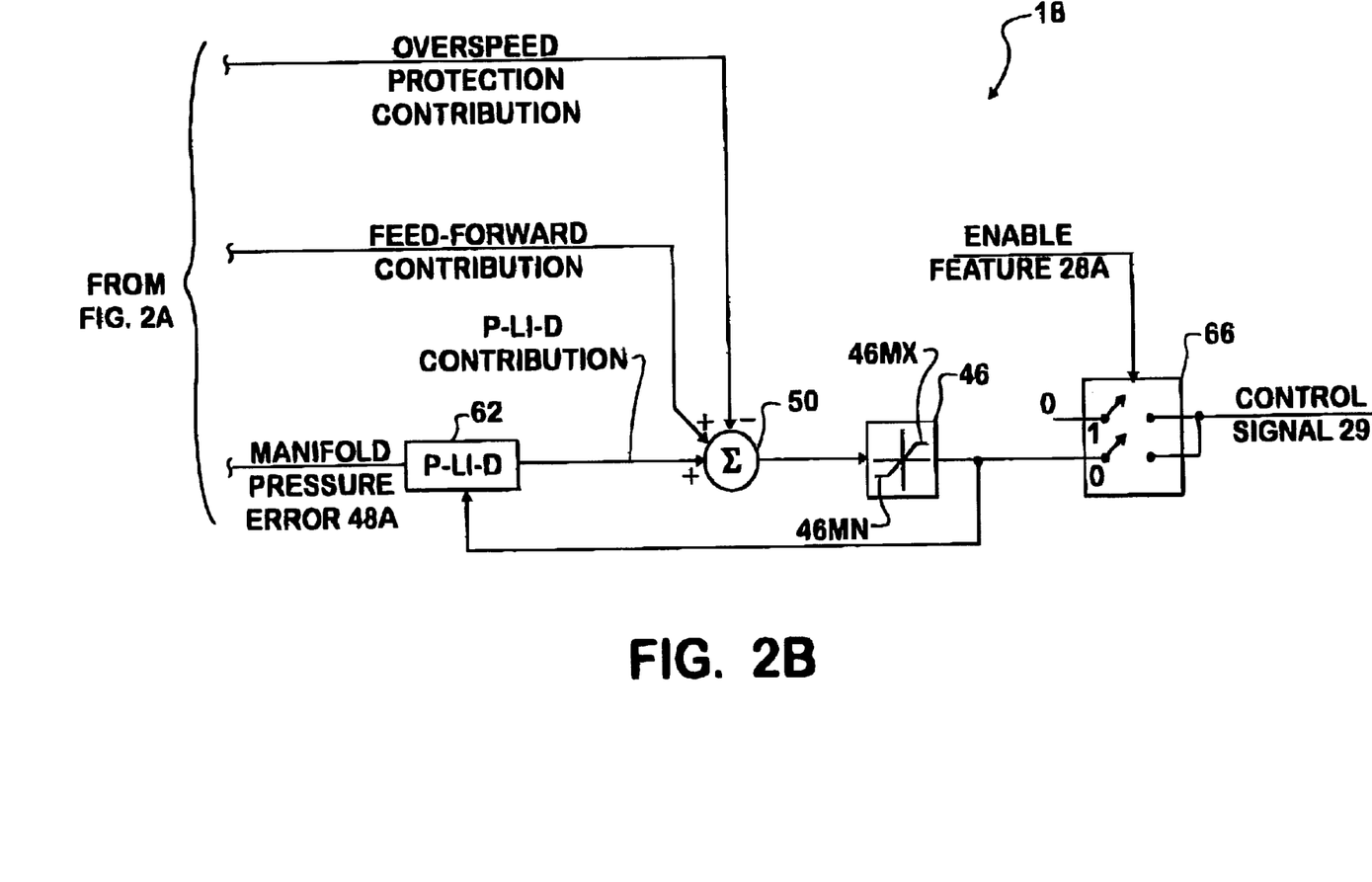

FIGS. 2A and 2B show more detail of the control strategy. Control 18 comprises two look-up tables, or two-dimensional maps 34, 36: namely, a feed-forward look-up table 34 and a desired boost look-up table 36. It also comprises six limiting functions 23, 38, 40, 42, 44, 46: namely, a barometric pressure limiting function 23 that establishes a maximum limit 23MX and a minimum limit 23MN for barometric pressure; an engine load limiting function 38 that establishes a maximum limit 38MX and a minimum limit 38MN for engine load; an engine idle speed limiting function 40 that uses High Idle 28B as a maximum limit 40HI for engine speed and Low Idle 28C as a minimum limit 40LO for engine speed; a desired boost limiting function 42 that establishes a maximum limit 42MX and a minimum limit 42 MN for desired boost; a manifold pressure limiting function 44 that establishes a maximum limit 44MX and a minimum limit 44MN for manifold pressure; and a duty cycle limiting function 46 that establishes a maximum duty cycle limit 46MX and a minimum duty cycle limit 46MN. There are also: two summing functions 48, 50; four low-pass filtering functions 25, 54, 56, 58; an overspeed protection sub-strategy 60; a P-LI-D (proportional, conditional integral, derivative) function 62; and a switch function 66.

In order for the data values of Barometric Pressure 22A, Engine Load 24A, Engine Speed 20A, and Manifold Pressure 26A to be considered valid for processing by control 18, the value of each must lie within a respective predetermined range defined between upper and lower limit values of the respective limiting function 23, 38, 40, 44. Whenever the value of any of these three inputs falls outside the respective range, a respective default value defined by the appropriate limit is substituted and processed by control 18.

A primary purpose for processing each input through a respective limiting function is to guard against subsequent processing of data that is likely to be false, and therefore apt to produce an incorrect, and potentially undesirable, result. For example, false information could be given by a sensor error or malfunction or by a processing error.

The low-pass filtering functions serve to prevent too large a change in data value from one processing iteration to the next from having an immediate effect on the result. For example, such a large change could be due to a random processing glitch that should not be allowed to have an effect of the control process, and therefore should be ignored. A succession of large changes however will be allowed to have an effect because they are indicative of actual change as distinguished from a random glitch.

In the ensuing description, reference to processed Barometric Pressure, processed Engine Speed, processed Engine Load, and processed Manifold Pressure should be understood in context to refer to data that has been subjected to processing by the respective limiting function and the respective low-pass filtering function so as to be both appropriate for subsequent processing and presumptively valid and indicative of the value of the actual variable, except possibly when being limited by a limiting function.

Look-up tables 34, 36 make use of both processed Engine Load data and processed Engine Speed data. The processed Engine Speed data is also used by overspeed protection sub-strategy 60.

Look-up table 34 correlates various feed-forward values of Control Signal 29 with various combinations of engine load and engine speed over relevant load and speed operating ranges. Look-up table 36 correlates various desired boost values with various combinations of engine load and engine speed over relevant load and speed operating ranges. Boost is understood to be the same as intake manifold pressure.

Figure 3:
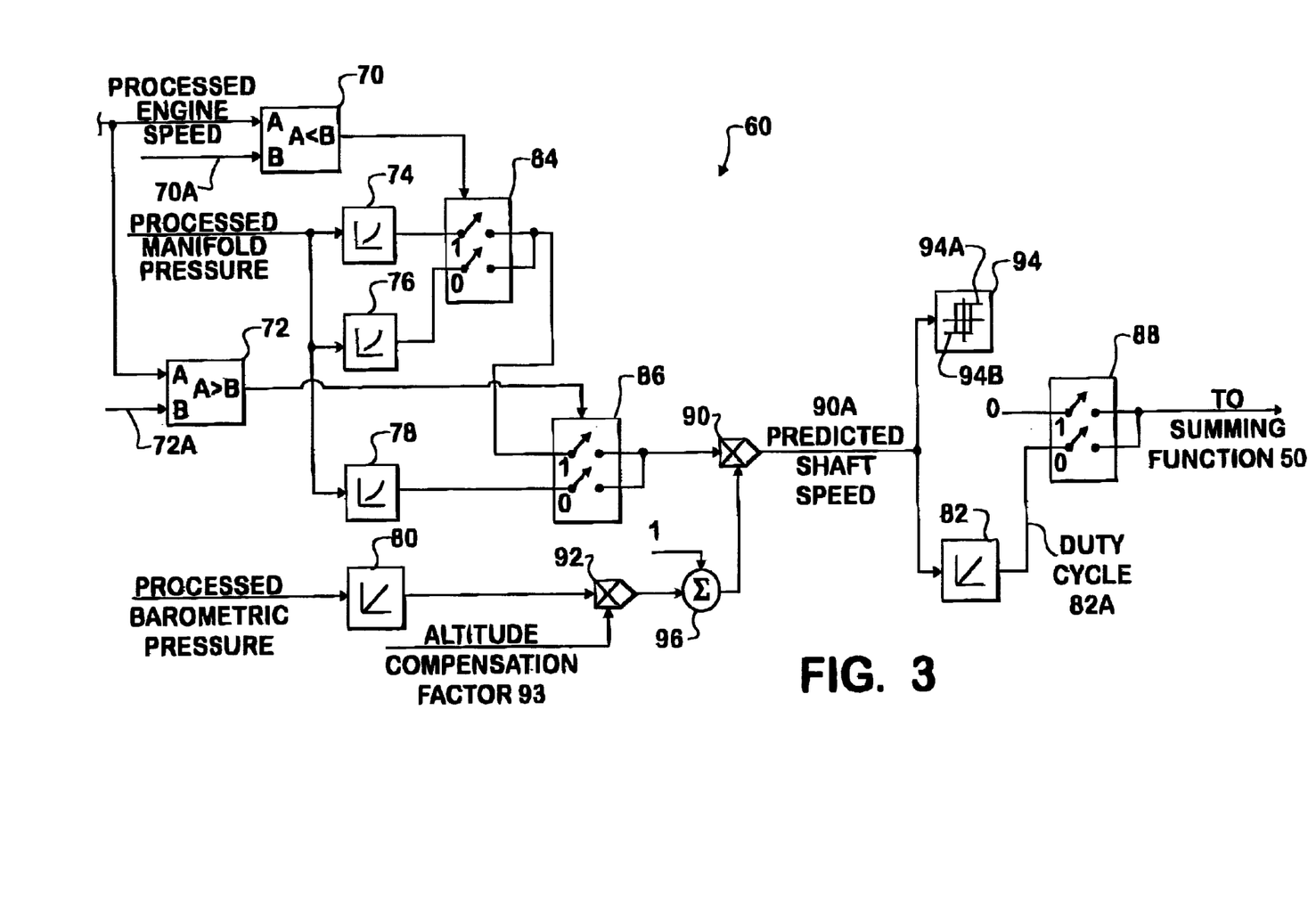
FIG. 3 is a detailed schematic diagram of a first sub-strategy within the general strategy.

FIG. 3 discloses detail of overspeed protection sub-strategy 60. The sub-strategy comprises: two comparison functions 70, 72; five function generators, or one-dimensional maps, 74, 76, 78, 80, 82; three switch functions 84, 86, 88; two multiplication functions 90, 92; a relay function 94; and a summing function 96. The strategy of overspeed protection 60 is to predict rotational speed of the turbine shaft of turbocharger 12 and act upon the duty cycle signal applied to the turbocharger solenoid in such a way that the turbine shaft speed value 90A may not exceed a predetermined maximum value corresponding to a maximum allowable speed for the turbine shaft.

Comparison function 70 compares the data value of processed Engine Speed to a defined value 70A. Comparison function 72 compares the data value of processed Engine Speed to a defined value 72A. The defined value 70A is greater than the defined value 72A. If the data value of processed Engine Speed is greater than the defined value 70A, comparison functions 70, 72 act via switch functions 84, 86 so as to cause function generator 76 to provide the first of the two inputs to multiplication function 90. If the data value of processed Engine Speed is between the defined values 70A and 72A, inclusive, comparison functions 70, 72 act via switch functions 84, 86 so as to cause function generator 74 to provide the first input to multiplication function 90. If the data value of processed Engine Speed is less than the defined value 72A, comparison functions 70, 72 act via switch functions 84, 86 so as to cause function generator 78 to provide the first input to multiplication function 90.

The particular function generation characteristic of each function generator 74, 76, 78 is empirically determined. The processed Manifold Pressure is a common input to all three function generators 74, 76, 78. The defined values 70A and 72A are chosen to divide the entire range of turbine shaft speeds into three sub-ranges, or portions, within a first of which engine speed is less than the speed defined by data value 72A, within a second of which engine speed lies within a range between speeds defined by data values 72A and 70A, inclusive, and within a third of which engine speed is greater than the speed defined by data value 70A. Over the respective portion of the speed range defined by the respective function generator 74, 76, 78, the function embedded in the function generator correlates predicted shaft speed with manifold pressure for a given barometric pressure and engine speed. Each function may be empirically derived by statistical correlation techniques, and the extent to which an entire speed range is sub-divided may depend on statistical results. Hence, the use of three sub-ranges in the disclosed embodiment may be considered merely illustrative.

Function generator 80 correlates values of perceived altitude to values of barometric pressure. The value of the perceived altitude provided by function generator 80 for subsequent processing is determined by the value of processed Barometric Pressure. A value of perceived altitude from function generator 80 is used in an altitude compensation calculation. Multiplication function 92 multiplies that value by an altitude compensation factor 93, and the value of unity (1) is added to that product by summing function 96. The result of summing function 96 forms the second input to multiplication function 90, and that result serves to adjust the predicted turbine shaft speed for altitude. As altitude increases above sea level, the shaft will tend to run at increasing speed because of the decrease in density of atmospheric air. Function 90 multiplies the first and second inputs to it to develop an altitude-compensated data value for Predicted Shaft Speed 90A. The data values contained in function generator 80 may be considered as baseline data obtained by operating a turbocharger in a given setting. The altitude compensation factor is specified by the turbocharger manufacturer for a particular model of turbocharger used in a particular model of engine, and hence altitude compensation factor 93 is a calibration constant that is programmed in control 18 for that engine model.

The data value for Predicted Shaft Speed 90A is processed by function generator 82 and by relay function 94. Function generator 82 correlates values of a duty cycle with predicted shaft speed. In general, the relationship is one where the duty cycle increases as predicted shaft speed increases. Relay function 94 and switch function 88 cooperate to impart a certain hysteresis to the through-switching of a data value for a duty cycle 82A obtained from function generator 82 to summing function 50. The switch function is effective to allow the data value of duty cycle 82A to pass as an input to summing function 50 when the data value for Predicted Shaft Speed 90A exceeds a maximum allowable actual speed for the turbocharger shaft. One data value defines a maximum allowable actual speed 94A, and another data value defines a minimum allowable actual speed 94B for relay function 94. Relay function 94 is effective upon the data value for Predicted Shaft Speed 90A exceeding that maximum allowable actual speed to cause switch function 88 to pass the data value obtained from function generator 82 for duty cycle 82A. A data value for duty cycle 82A will continue to be passed until the data value for Predicted Shaft Speed 90A falls below the data value for minimum allowable actual speed 94B that is itself somewhat below the data value for maximum allowable actual speed 94A. The effect on the turbocharger is a reduction in shaft speed. Only when predicted shaft speed, as sensed by relay function 94, falls below the value for minimum allowable actual speed 94B will the relay function be effective via switch function 88 to once again pass a zero value to summing function 50 instead of a duty cycle value 82A from function generator 82. The interaction of relay function 94 and switch function 88 with function generator 82 assures that having once approached, or perhaps even reached, maximum allowable shaft speed, actual shaft speed will have to decrease some predetermined amount before it is again allowed to increase toward maximum allowable speed. The interaction amounts to what may be considered a buffering of shaft speed that avoids the occurrence of repeating decelerations and accelerations near maximum speed. The output of the overspeed protection sub-strategy which is supplied as an input to summing function 50 in FIG. 2B is subtracted from the sum of a value from look-up table 34 and a value from P-LI-D function 62.

In FIG. 2A, a value from look-up table 36 represents the desired boost, meaning desired manifold pressure, that turbocharger 12 should be producing in the engine intake manifold, subject to any limiting imposed by limiting function 42. A data value for processed Manifold Pressure 26A, representing actual boost being produced by the turbocharger unless limited by limiting function 44, is subtracted from a data value for desired boost that is called for by the processed Engine Speed and the processed Engine Load to create a data value for Manifold Pressure Error 48A that is subsequently processed by P-LI-D function 62. One may therefore perceive that the value of processed Manifold Pressure, or processed boost, represents negative feedback and that the value of Manifold Pressure Error 48A represents an error signal input for the closed loop control of turbocharger 12 via P-LI-D function 62.

P-LI-D function 62 represents the primary control for developing the pulse width modulated signal applied to the control solenoid of turbocharger 12 that sets vane position. Overspeed protection sub-strategy 60 and look-up table 34 are arranged to interact with the primary control provided by P-LI-D function 62. The extent of the interaction however depends on certain circumstances. The interaction is performed by summing function 50, which algebraically sums a data value from P-LI-D function 62 (considered positive), a data value from look-up table 34 (considered positive), and the data value output of overspeed protection sub-strategy 60 (considered negative) to create a value for Control Signal 29. The latter signal is subject to limiting by limiting function 46. Moreover, only when the turbocharger feature is enabled by engine control 18 is Control Signal 29 actually applied to turbocharger 12. Hence, when the turbocharger feature is enabled, the Enable Feature parameter acts via switch function 66 to cause Control Signal 29 to be applied to PWM driver 30.

P-LI-D function 62 is capable of processing Manifold Pressure Error data 48A through proportional, integral, and derivative functions. However, these three functions are not necessarily always simultaneously applied. In particular, the integral function is selectively, or conditionally, employed depending on prevailing conditions. Hence, for some conditions, P-LI-D function 62 may actually perform proportional, integral, and derivative functions, but for other conditions, it may actually perform only proportional and derivative functions.

Figure 4:
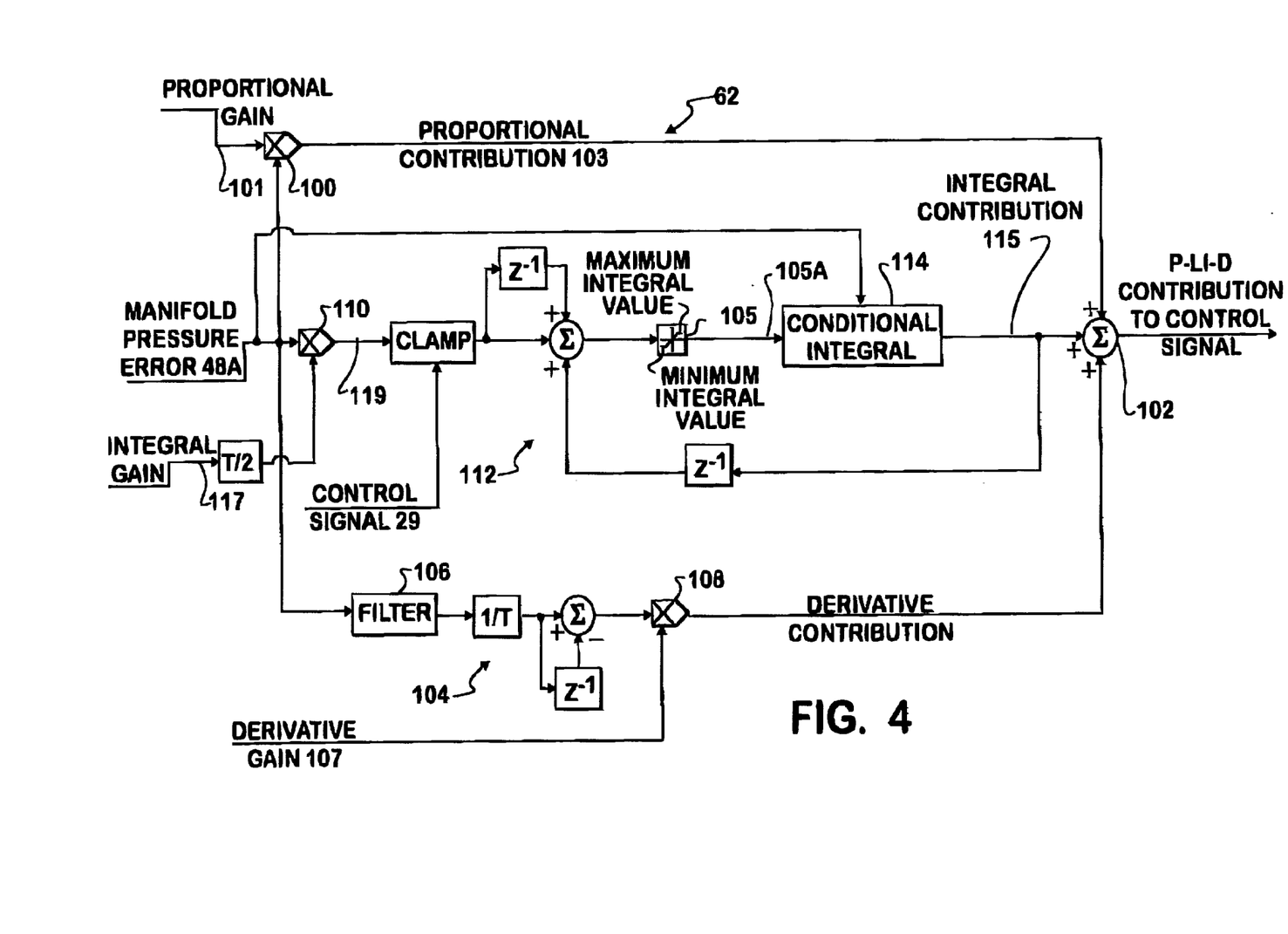
FIG. 4 is a detailed schematic diagram of a second sub-strategy within the general strategy.

Detail of P-LI-D function 62 appears in FIG. 4. The proportional function is performed by a multiplication function 100 that multiplies the data value for Manifold Pressure Error data 48A by a data value for a Proportional Gain factor 101. A data value for a Proportional Contribution 103 is the resulting product of the multiplication and forms a first input to a summing function 102.

The derivative function of P-LI-D 62 is performed in the following manner. A data value for Manifold Pressure Error 48A is filtered by a low-pass filtering function 106 and then differentiated by a derivative function 104. A multiplication function 108 multiplies the data value resulting from the differentiation by a Derivative Gain factor 107. The product of that multiplication is a second data input to summing function 102.

A third input to summing function 102 is a data value for an Integral Contribution 115. A multiplication function 110 multiplies the data value for Manifold Pressure Error 48A by an Integral Gain factor 117, and the multiplication product 119 is integrated by an integration function 112. The integration result is processed by a limiting function 105 and if necessary, limited maximally or minimally before being allowed to pass to a conditional integral function 114 for further processing. The data value passed to the conditional integral function is designated Integral Value 105A.

Proportional Gain factor 101, Derivative Gain factor 107, and Integral Gain factor 117 are calibration constants.

Conditional integral function 114 determines if the data value for Integral Value 105A will be allowed to pass to summing function 102. If the data value is allowed to pass, then P-LI-D function 62 acts as a proportional, integral, derivative controller (PID controller). But if the data value is not allowed to pass, then P-LI-D function 62 acts as a proportional and derivative controller. When acting as a PID controller, P-LI-D function utilizes Control Signal 29 as feedback for limiting the contribution that the integration function can make under certain conditions.

Figure 5:
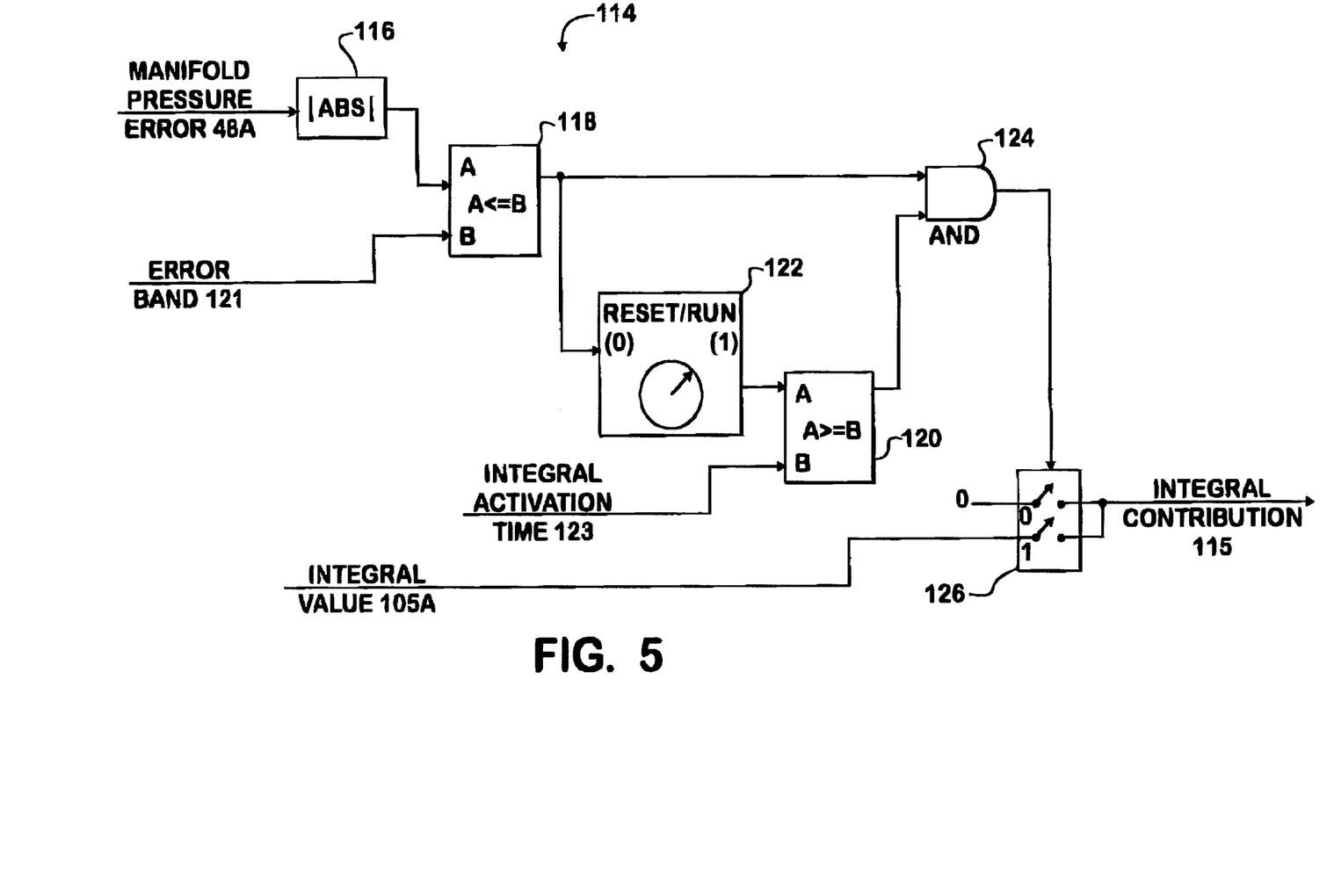
FIG. 5 is a detailed schematic diagram of a third sub-strategy within the general strategy.

Detail of the sub-strategy embodied in conditional integral function 114 is shown in FIG. 5. Function 114 comprises an absolute value function 116, two comparison functions 118, 120, a timer function 122, an AND logic function 124, and a switch function 126. A data value for an Error Band 121 defines a range of data values for manifold pressure error for which it has been determined that the integral function of P-LI-D function 62 will be active in contributing to summing function 102, provided that the data value for Manifold Pressure Error 48A has remained within that range for a defined time. Absolute value function 116 and comparison function 118 coact to determine whether the manifold pressure error leaves the range. A data value for an Integral Activation Time 123 sets the defined time. So long as the data value for Manifold Pressure Error 48A is within the range, timer function 122 runs, and when the running time finally exceeds the defined time set by the Integral Activation Time 123, AND function 124 acts via switch function 126 to pass the data value for Integral Value 105A to be the data value for Integral Contribution 115. Should the data value for Manifold Pressure Error 48A leave the defined range, AND function 124 acts via switch function 126 to cause the data value for Integral Contribution 115 to be set to zero value, and timer function 122 is reset to zero.

The conditional-I sub-strategy is believed to be a useful technique for optimizing response and accuracy in turbocharger boost control. By utilizing only P-D control when error is relatively larger, the control strategy is endowed with faster response and less overshoot than would be the case if P-I-D control were employed. Exclusive reliance on P-D control however never allows the error to be reduced to zero, or at least substantially zero. By allowing integral control to become effective once error has been reduced to less than the relatively larger error during which only P-D control was effective, then it becomes possible to reduce the error to zero, or substantially zero.

Figure 6A:
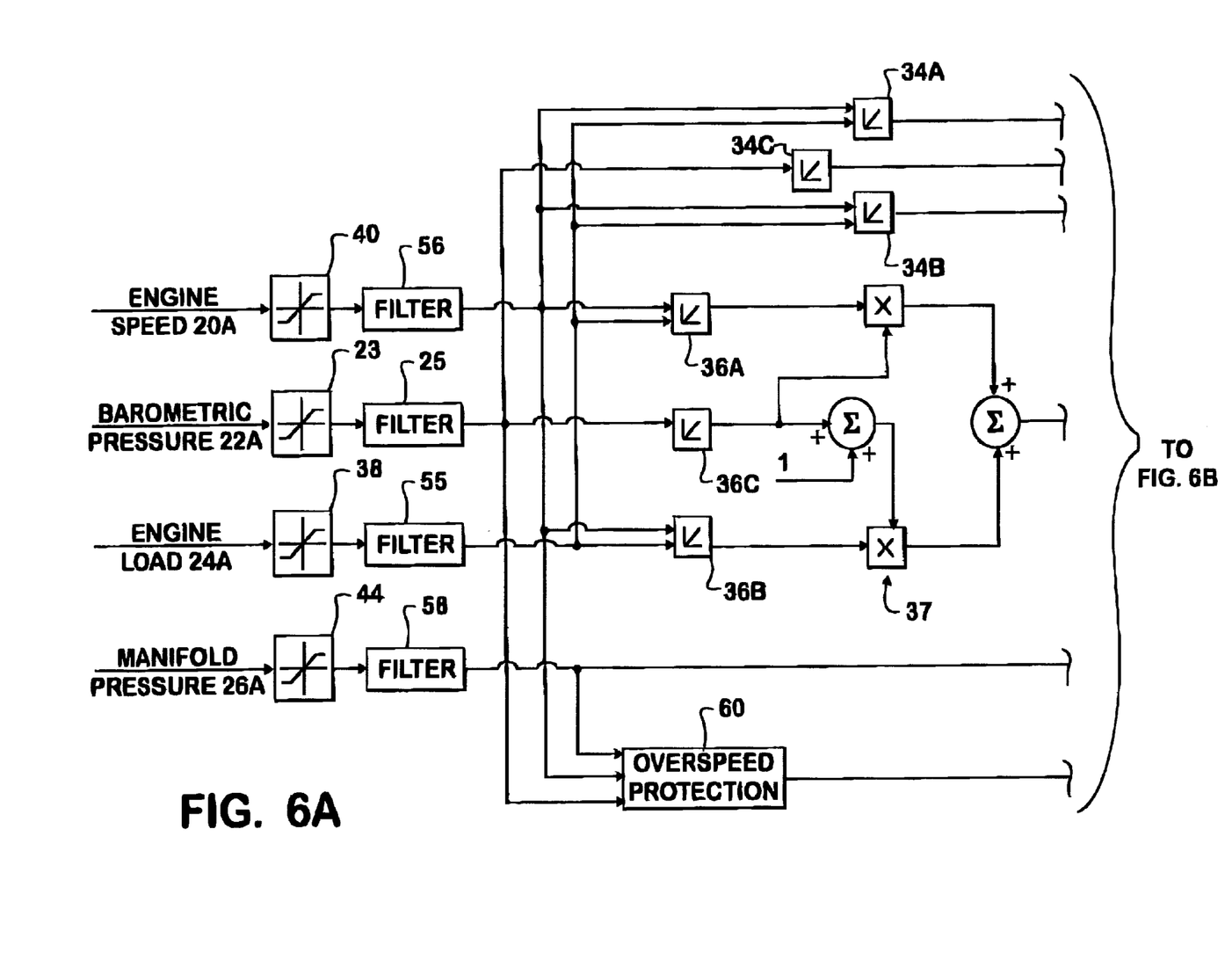
FIGS. 6A and 6B collectively form a detailed schematic diagram of a modified general strategy.
Figure 6B:
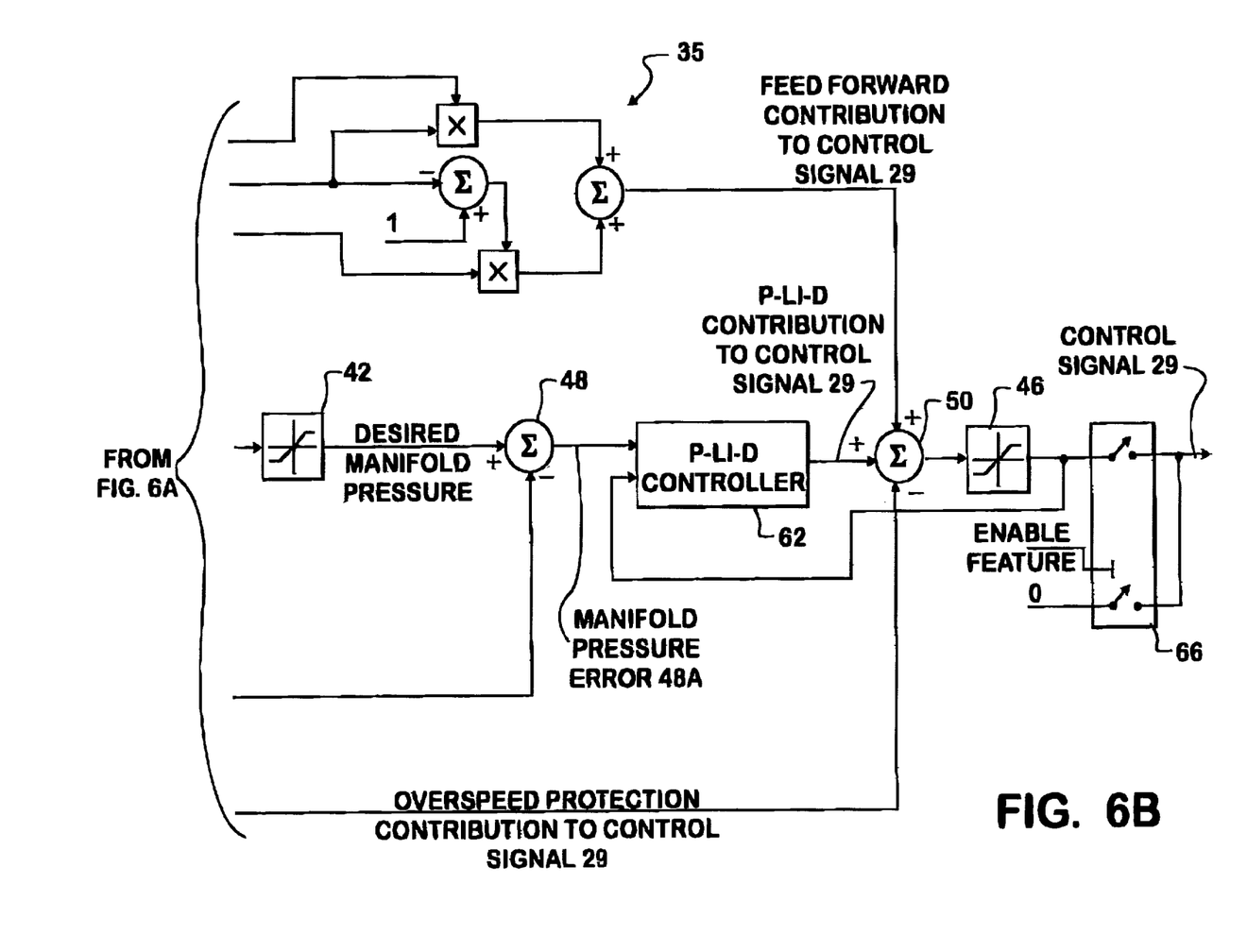

FIGS. 6A and 6B show a control strategy that in a number of respects is like the one described with reference to FIGS. 2 and 3. Hence, like reference numerals and designations in the two pairs of Figures represent like functions and data. The strategy of FIGS. 6A and 6B differs from that of FIGS. 2A and 2B in that the Feed Forward Contribution to Control Signal 29 and the Desired Manifold Pressure are developed in different ways. There are also differences in the overspeed protection sub-strategy that will be explained with reference to FIG. 7 later.

In FIGS. 6A and 6B, processed Barometric Pressure performs a slewing function in the development of the Feed Forward Contribution to Control Signal 29 and the Desired Manifold Pressure, i.e. the desired boost. There are two look-up tables 34A, 34B that correlate Feed Forward data values with sets of processed Engine Speed and processed Engine Load data values. Table 34A applies for a high altitude range, while table 34B applies for a low altitude range. A function generator 34C correlates slewing factor values with values of barometric pressure. For a processed Barometric Pressure, the processing uses function generator 34C to determine a corresponding slewing factor value. That value is used in slewing (reference numeral 35) of respective feed-forward values that are obtained from respective tables 34A and 34B in correlation with present processed Engine Speed and processed engine load to yield the Feed Forward Contribution to Control Signal 29. In this way, the Feed Forward Contribution is compensated for changes in altitude.

Collectively, the two look-up tables 34A, 34B and the slewing function 34C would be equivalent to a single three-dimensional look-up table of feed-forward values that would cover the entire altitude range for all sets of values of processed Engine Speed and processed engine load.

Processed Barometric Pressure is likewise used in the performance of a slewing function to develop Desired Manifold Pressure. Two look-up tables 36A, 36B correlate Desired Manifold Pressure data values with sets of processed Engine Speed and processed Engine Load data values. Table 36A applies for a high altitude range, while table 36B applies for a low altitude range. A function generator 36C correlates slewing factor values with values of barometric pressure. For a processed Barometric Pressure, the processing uses function generator 36C to determine a corresponding slewing factor value. That value is used in slewing (reference numeral 37) of respective values that are obtained from respective tables 36A and 36B in correlation with present processed Engine Speed and processed engine load to yield a value for Desired Manifold Pressure. The value yielded is still subject to limiting by limiting function 42. In this way, the processed Desired Manifold Pressure also is compensated for changes in altitude.

Collectively, the two look-up tables 36A, 36B and the slewing function 36C would be equivalent to a single three-dimensional look-up table that would cover the entire altitude range for all combinations of engine speed and fueling.

Figure 7:
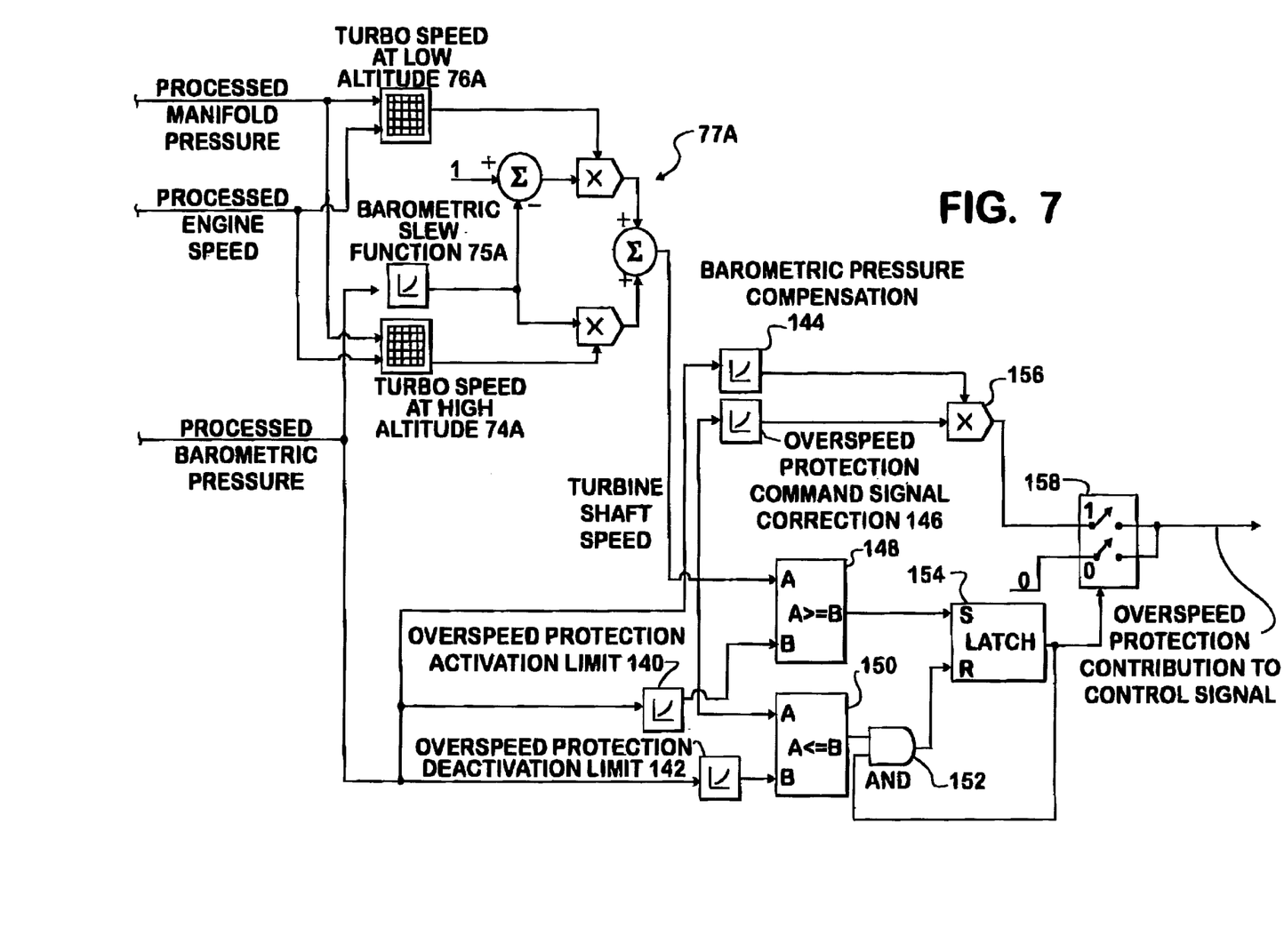
FIG. 7 is a detailed schematic diagram of one sub-strategy within the modified general strategy of FIGS. 6A and 6B.

FIG. 7 shows an enhanced form of overspeed protection sub-strategy that provides a different form of barometric pressure compensation for the predicted turbine shaft speed. Processed Barometric Pressure is used in the performance of a slewing function to develop a predicted value for turbine shaft speed. Two look-up tables 74A, 76A correlate shaft speed data values with sets of processed Engine Speed and processed Manifold Pressure. Table 74A applies for a high altitude range, while table 74B applies for a low altitude range. A function generator 75A correlates slewing factor values with values of barometric pressure. For a processed Barometric Pressure, the processing uses function generator 75A to determine a corresponding slewing factor value. That value is used in slewing (reference numeral 77A) of respective values that are obtained from the respective tables 74A and 76A in correlation with present processed Engine Speed and processed Manifold Pressure to yield a value for shaft speed.

The overspeed protection sub-strategy further comprises four function generators 140, 142, 144, 146, two comparison functions 148, 150, an AND logic function 152, a latch function 154, a multiplication function 156, and a switch function 158.

The value of processed Barometric Pressure is used to select from function generator 144 a value for barometric pressure compensation. Shaft speed is used to select from function generator 146 a value for Overspeed Protection Command Signal Correction. The two selected values are processed by multiplication function 156 to yield a data value for Overspeed Protection Contribution to Control Signal 29.

Switch function 158, when set, allows the overspeed protection contribution to Control Signal 29 to pass to summing function 50. When the switch function is not set, it does not allow the contribution to pass, and instead makes a zero value contribution.

The purpose of latch function 154 is to control the setting and resetting of switch function 158 as did relay function 94 in FIG. 3. Hysteresis continues to be imparted to the switch function characteristic, but now with the hysteresis band being adjusted for changes in barometric pressure.

Hence, turbine shaft speed data is compared with values corresponding to the hysteresis band limits by the respective comparison functions 148, 150. Function generator 140 sets an upper limit for the band according prevailing barometric pressure. Function generator 142 sets a lower limit for the band according prevailing barometric pressure.

Whenever shaft speed equals or exceeds the upper band limit, comparison function 148 sets latch function 154. The setting of the latch function in turn sets switch function 158, causing the calculated overspeed protection contribution to the control signal to pass to summing function 50 where it is subtracted from the sum of the other two inputs to the summing function.

Whenever shaft speed equals or falls below the lower limit of the hysteresis band, comparison function 150 resets latch function 154. The resetting of the latch function in turn resets switch function 158, terminating passage of the calculated overspeed protection contribution to the control signal to summing function 50, and instead passing a zero value contribution.

While a presently preferred embodiment of the invention has been illustrated and described, it should be appreciated that principles of the invention are applicable to all embodiments and uses that fall within the scope of the following claims.

What is claimed is:

1. An internal combustion engine comprising:
   a turbocharger that creates engine boost and comprises a selectively positionable mechanism for controlling the amount of boost created by passage of exhaust gas through the turbocharger;
   a control for selectively positioning the mechanism to control the amount of boost in accordance with data inputs;
   wherein the control comprises a processor for processing data, including the data inputs, to develop a control signal for selectively positioning the mechanism;
   a first data input to the processor comprising data corresponding to engine load;
   a second data input to the processor comprising data corresponding to engine speed;
   a look-up table programmed with values representing desired boost corresponding to sets of values representing various combinations of engine speed and engine load;
   a third data input to the processor comprising data corresponding to the amount of boost being created by the turbocharger;

wherein the processor selects from the look-up table a value for desired boost corresponding to values of the first data input and the second data input;

the processor processes the value of the third data input and the selected value for desired boost from the look-up table to generate error data defining error between the amount of boost being created by the turbocharger and the desired boost; and the processor further processes the error data according to the value of the error data to cause the control signal to position the mechanism to reduce the error such that when the error data is less than a predetermined value, further processing comprises processing the error data with proportional, integral, and derivative control, and when the error data is not less than the predetermined value, the further processing comprises processing the error data with proportional and derivative control but without integral control.

2. An internal combustion engine as set forth in claim 1 wherein the processor comprises a further look-up table programmed with feed-forward values for use in developing the control signal correlated with sets of values representing various combinations of engine speed and engine load;

the processor selects from the further look-up table a feed-forward value corresponding to values of the first data input and the second data input; and the processor processes the selected feed-forward value from the further look-up table and uses the result in developing the control signal.

3. An internal combustion engine as set forth in claim 2 wherein the processor also comprises a function generator programmed with values for turbocharger speed corresponding to values of boost for a given barometric pressure; and wherein the processor selects from the function generator a value for turbocharger speed corresponding to the value of the third data input; and the processor processes the selected turbocharger speed from the function generator so as to cause the control signal to limit turbocharger speed to a predetermined maximum speed during a condition when the control signal would otherwise be calling for a turbocharger speed greater than the predetermined maximum.

4. An internal combustion engine as set forth in claims 3 including a fourth data input to the processor comprising data defining barometric pressure; and wherein the processor processes the fourth data input to compensate the selected turbocharger speed from the function generator for barometric pressure different from the given barometric pressure.

5. An internal combustion engine as set forth in claim 3 wherein the processor includes a hysteresis function that becomes effective upon a calculated value of turbocharger speed reaching the predetermined maximum speed to cause the control signal to reduce the speed until the processor calculates a new value that is less than the predetermined maximum speed by the amount of hysteresis in the hysteresis function.

6. An internal combustion engine as set forth in claim 5 wherein the processor includes processing of values in the hysteresis function to compensate those values for change in barometric pressure.

7. An internal combustion engine as set forth in claim 1 wherein the selectively positionable mechanism of the turbocharger comprises selectively positionable vanes.

8. An internal combustion engine comprising:

a turbocharger that creates engine boost and comprises a selectively positionable mechanism for controlling the amount of boost created by passage of exhaust gas through the turbocharger;

a control for selectively positioning the mechanism to control the amount of boost in accordance with data inputs;

wherein the control comprises a processor for processing data, including the data inputs, to develop a control signal for selectively positioning the mechanism;

a first data input to the processor comprising data corresponding to engine load;

a second data input to the processor comprising data corresponding to engine speed;

a third data input to the processor comprising data corresponding to the amount of boost being created by the turbocharger;

a first look-up table programmed, with values representing desired boost corresponding to sets of values representing various combinations of engine speed and engine load;

a second look-up table programmed with values representing feed-forward values for use in developing the control signal correlated with sets of values representing various combinations of engine speed and engine load;

a function generator programmed with values for turbocharger speed corresponding to values of boost for a given barometric pressure; and wherein the processor selects from the first look-up table a value for desired boost corresponding to values of the first data input and the second data input;

the processor selects from the second look-up table a feed-forward value corresponding to values of the first data input and the second data input;

the processor selects from the function generator a value for turbocharger speed corresponding to the value of the third data input; and the processor processes the value of the third data input and the value of desired boost selected from the first look-up table to generate a value for error data defining error between the amount of boost being created by the turbocharger and the desired boost and further processes the error data according to the value of the error data to create a first component of the control signal for causing the mechanism to reduce the error such that when the value of error data is less than a predetermined value, further processing comprises processing the error data with proportional, integral, and derivative control, and when the value of error data is not less than the predetermined value, the further processing comprises processing the error data with proportional and derivative control signal but without integral control;

the processor processes the selected feed-forward value from the second look-up table to create a second component of the control signal; and the processor processes the selected turbocharger speed from the function generator to create a third component of the control signal for limiting turbocharger speed. to a predetermined maximum speed during a condition when the control signal would otherwise be calling for a turbocharger speed greater than the predetermined maximum.

9. An internal combustion engine comprising:

a variable nozzle turbocharger powered by passage of exhaust gas through the turbocharger for creating and controlling engine boost;

a control for controlling vane position of the variable nozzle turbocharger to control the amount of boost in accordance with data inputs;

wherein the control comprises a processor for processing data, including the data inputs, to develop a control signal for controlling the vane position;

wherein the processor processes certain data to develop a value for desired boost and processes that value with a value corresponding to the amount of boost being created by the turbocharger to generate error data defining error between the amount of boost being created by the turbocharger and the desired boost; and the processor develops the control signal by further processing of the error data;

wherein the data inputs include data corresponding to engine load and data corresponding to engine speed;

the processor comprises a look-up table programmed with values representing desired boost corresponding to sets of values representing various combinations of engine speed and engine load;

wherein the processor selects from the look-up table a value for desired boost corresponding to values of the engine load data and the engine speed data;

the processor processes the value of the amount of boost being created by the turbocharger and the selected value for desired boost from the look-up table to generate the error data; and the processor further processes the error data according to the value of the error data to cause the control signal to control vane position so as to reduce the error such that when the value of error data is less than a predetermined value, further processing comprises processing the error data with proportional, integral, and derivative control, and when the value of error data is not less than the predetermined value, the further processing comprises processing the error data with proportional and derivative control but without integral control.

10. An internal combustion engine comprising:

a device that comprises a selectively positionable mechanism in a flow path through the engine for controlling a pressure in the flow path;

a control for selectively positioning the mechanism in accordance with data inputs;

wherein the control comprises a processor for processing data, including the data inputs, to develop a control signal for selectively positioning the mechanism;

the processor generates error data for positioning the mechanism; and the processor processes the error data according to the value of the error data to cause the control signal to position the mechanism to reduce the error such that when the value of error data is less than a predetermined value, the error data is processed using proportional, integral, and derivative control, and when the value of error data is not less than the predetermined value, the error data is processed using proportional and derivative control but without integral control.

11. An internal combustion engine as set forth in claim 10 wherein the device comprises a turbocharger and the selectively positionable mechanism comprises selectively positionable vanes of the turbocharger.

12. A method of controlling boost in an internal combustion engine that has a turbocharger by selectively positioning a mechanism for controlling the amount of boost created by passage of exhaust gas through the turbocharger, the method comprising:

selectively positioning the mechanism in accordance with data inputs by processing data, including the data inputs;

selecting from a look-up table a value for desired boost corresponding to values of data corresponding to engine load and data corresponding to engine speed;

processing data defining the amount of boost being created by the turbocharger and the selected value for desired boost from the look-up table to generate error data defining error between the amount of boost being created by the turbocharger and the desired boost; and processing the error data according to the value of the error data to position the mechanism to reduce the error such that when the value of the error data is less than a predetermined value, the processing comprises processing the error data with proportional, integral, and derivative control, and when the value of the error data is not less than the predetermined value, the processing comprises processing the error data with proportional and derivative control but without integral control.

13. A method of controlling boost in an internal combustion engine that has a turbocharger by selectively positioning a mechanism for controlling the amount of boost created by passage of exhaust gas through the turbocharger, the method comprising:

selectively positioning the mechanism in accordance with data inputs by processing data, including the data inputs;

selecting from a first look-up table a value for desired boost corresponding to values of a first data input corresponding to engine load and a second data input corresponding to engine speed;

selecting from a second look-up table a feed-forward value for use in developing a control signal for the mechanism corresponding to the values of the first data input and the second data input;

selecting from a function generator a value for turbocharger speed corresponding to the value of a third data input comprising data corresponding to the amount of boost being created by the turbocharger; and processing the value of the third data input and the value of desired boost selected from the first look-up table to generate error data defining error between the amount of boost being created by the turbocharger and the desired boost and further processing the error data according to the value of the error data to create a first component of the control signal for causing the mechanism to reduce the error such that when the value of the error data is less than a predetermined value, further processing comprises processing the error data with proportional, integral, and derivative control, and when the value of the error data is not less than the predetermined value, the further processing comprises processing the error data with proportional and derivative control but without integral control;

processing the selected feed-forward from the second look-up table to create a second component of the control signal; and processing the selected turbocharger speed from the function generator to create a third component of the control signal for limiting turbocharger speed to a predetermined maximum speed during a condition when the control signal would otherwise be calling for a turbocharger speed greater than the predetermined maximum.

14. A method of controlling a selectively positionable mechanism of a device in a flow path through the engine for controlling a pressure in the flow path, the method comprising:

processing data to develop a control signal for selectively positioning the mechanism;

generating error data defining error in the pressure condition; and processing the error data according to the value of the error data to position the mechanism to reduce the error such that when the value of the error data is less than a predetermined value, the error data is processed using proportional, integral, and derivative control, and when the value of the error data is not less than the predetermined value, the error data is processed using proportional and derivative control but without integral control.

* * * * *